Oct. 20, 1970    A. HORNIG    3,534,530
DEVICE FOR PRODUCING ELECTRIC FIELDS
Filed March 26, 1969    2 Sheets-Sheet 1
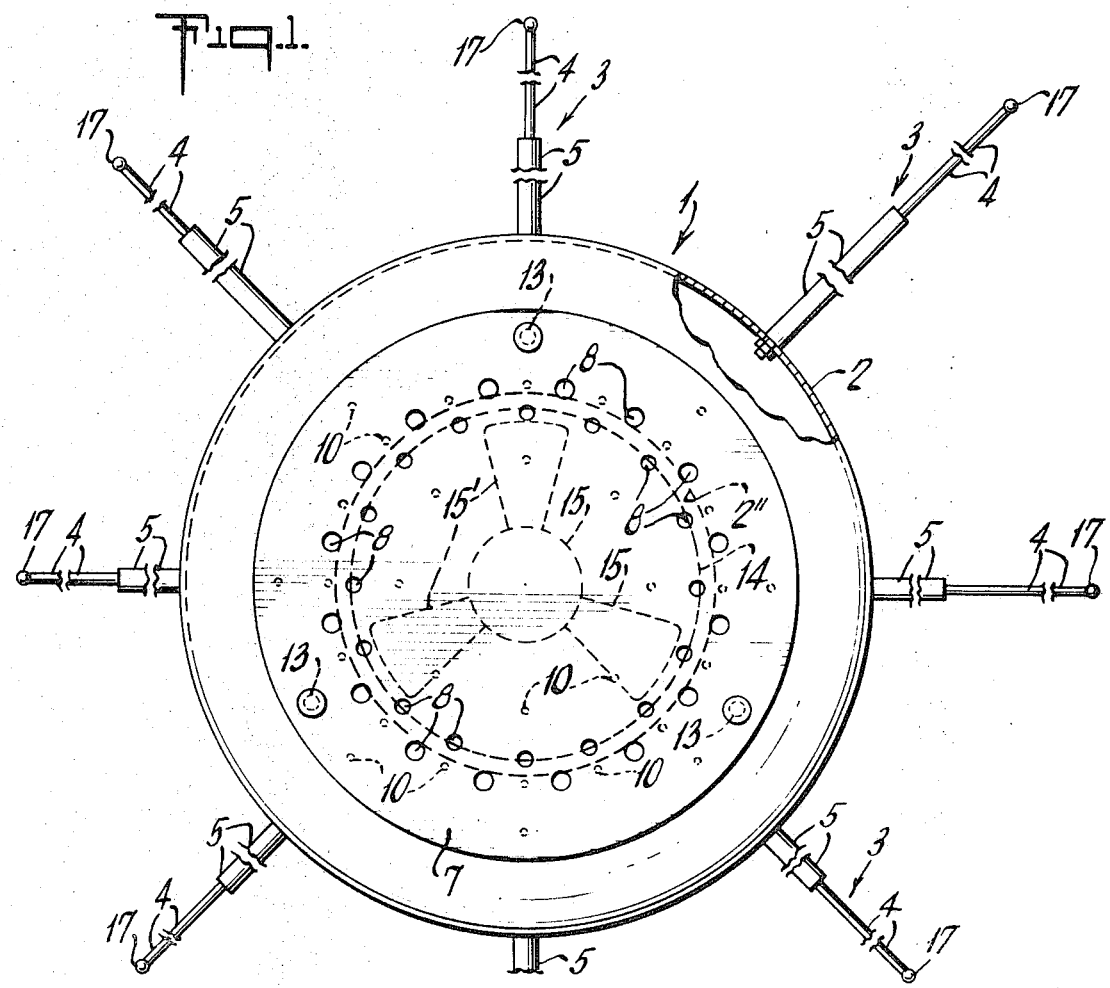
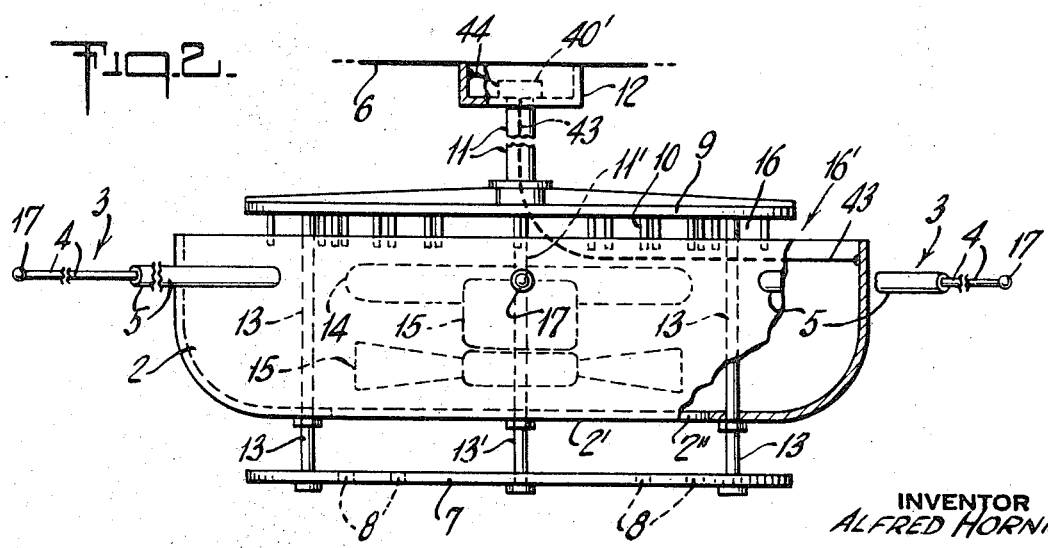
INVENTOR
ALFRED HORNIG
BY
Sandoe, Hopgood & Calimafde
ATTORNEYS

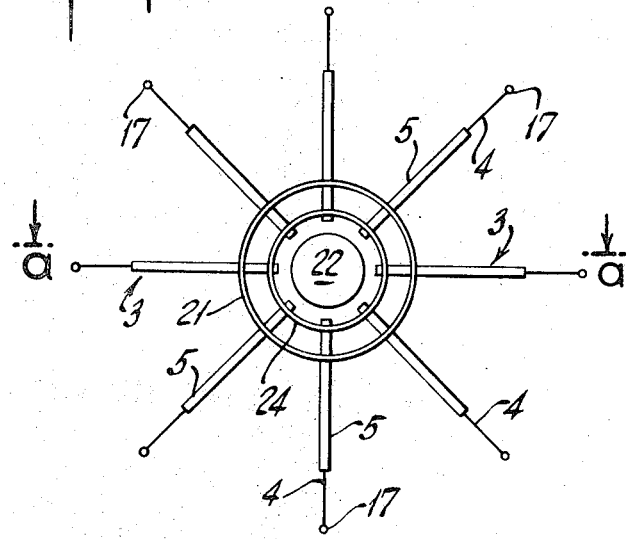
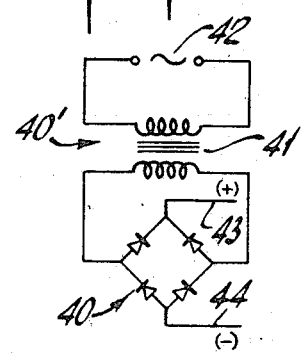
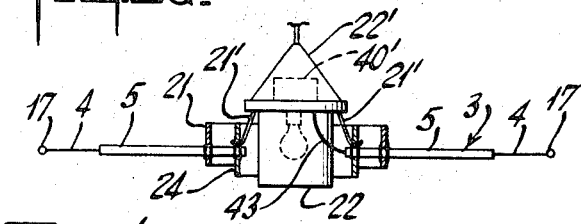
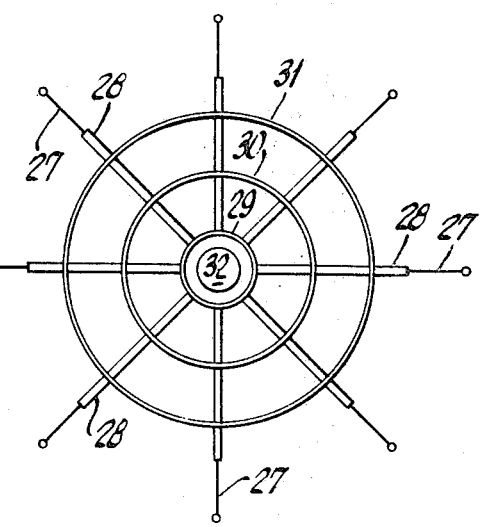
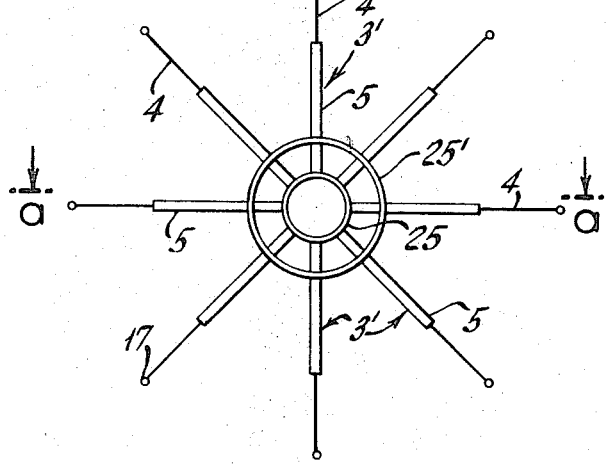
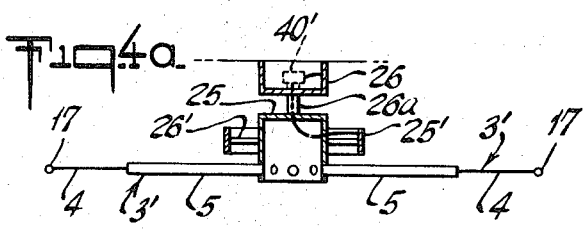
INVENTOR
ALFRED HORNIG United States Patent Office 3,534,530
Patented Oct. 20, 1970

3,534,530
DEVICE FOR PRODUCING ELECTRIC FIELDS
Alfred Hornig, Sudetenstrasse 4,
Wangen, Allgau, Germany
Continuation-in-part of application Ser. No. 612,857,
Jan. 31, 1967. This application Mar. 26, 1969, Ser.
No. 810,465
Claims priority, application Germany, Feb. 2, 1966,
H 58,419
Int. Cl. B03c 3/04
U.S. Cl. 55—148                                    8 Claims

ABSTRACT OF THE DISCLOSURE

The invention is a ceiling-mounted device to electrically acclimatize rooms and separate from the air particulate matter of less than one micron diameter. An electric field is produced in the room by a series of positively charged rod antennae electrodes which radiate from a center section like spokes of a wheel. The length of the antennae can be individually adjusted in accordance with the size and shape of the room to be acclimatized. The device also includes a series of concentric circular electrodes to collect the particular matter, and may house a light or fan to circulate the air therethrough.

This application is a continuation-in-part of applicant's co-pending application Ser. No. 612,857, filed Jan. 31, 1967, now abandoned.

BRIEF DESCRIPTION OF THE DRAWINGS

FIG. 1 is a plan view of a device of the invention as seen from below.

FIG. 2 is a partially cut away side view of the device of FIG. 1.

FIG. 2a is a schematic diagram of a power source of the invention.

FIG. 3 is a bottom view of an alternate embodiment of the invention.

FIG. 3a is a partially cut away side view taken along line a—a of FIG. 3.

FIG. 4 is a bottom view of another embodiment of the invention.

FIG. 4a is a cut away side view taken along line a—a of FIG. 4.

FIG. 5 is a bottom view of an additional embodiment of the invention.

BACKGROUND

The invention relates to a device for producing electric fields and in particular a ceiling-mounted arrangement of electrodes for electrically acclimatizing and cleansing the air of an enclosed room.

It is known that electrical fields can be effectively used to electrically acclimatize the atmosphere in a room, that this electrical acclimatization has beneficial biological effects, and that it can be used to condition particles suspended in the air for removal by plate-type electrodes.

Most prior art devices employ plate-type electrodes positioned adjacent one another. The effectiveness of such arrangements is greatly reduced by a blocking action which develops where large-surfaced electrodes are used, or the air relatively stationary.

Numerous publications in the technical press regarding aerosols and their biological effects show that in general air particles of greater diameter than one micron are not particularly harmful biologically because these larger particles are retained in the nasal and throat passages and are discharged from the body by the natural cleaning mechanism.

It is different with particles of a diameter of one micron or less. These reach the lungs and under certain conditions a high percentage are retained in the alveoli. If these particles are electrically charged their retention can be as high as 90%.

An object of the invention is to provide a device for electrically acclimatizing the atmosphere of a room, which device is especially suitable for attachment to the ceiling of the room.

A further objective of the invention is to provide a device which is effective in charging small particular matter, and which will remove the small charged particles from the air in the room.

SUMMARY

Basically the device of the invention is a ceiling-mounted electrode arrangement comprised of one or more negatively charged electrodes preferably cylindrical in shape, one or more positively charged annular electrodes adjacent to the negative electrodes, and a plurality of long, thin, adjustable rod antennae electrodes which are likewise positively charged and project radially into the room. In addition, the device of the invention provides for inclusion therein of a light source permitting it to double as a light fixture; and a fan to accelerate circulation of the air through the electrical field. The electrodes are charged by a high voltage generating means, and the rod antennae are adjustable in length so as to effect a strongly non-homogeneous field throughout the room.

The invention has the advantage of producing non-homogeneous fields which is of great importance in the stimulation of oxygen. The whole arrangement can be erected by an ordinary tradesman, and a good deodorizing effect is obtained as the electrodes can easily be kept clean. The extendable rod-type antennae present only a small surface to the dust, but are very effective in ionizing the room air due to the point or brush effect. By pulling out or pushing in the rod antennae electrodes the ionizing field can be adapted to the shape of the room.

Other objectives, advantages, and various further features of novelty and invention will be pointed out or will occur to those skilled in the art from a reading of the following specification in conjunction with the accompanying drawings.

DETAILED DESCRIPTION OF THE DRAWINGS

The embodiment of the invention shown in FIGS. 1 and 2 is intended to be attached to the ceiling of a room. It has a generally cup-shaped body member 2, open at top and bottom, and a plurality of rod antennae 3 radiating outwardly therefrom. The rod antennae 3 are rigidly connected to the cup-shaped body member 2 and have the same positive electrical potential as body member 2. The rod antennae 3 are of the telescoping variety having an outer tubular part 5 and an inner rod 4 which moves within part 5. At the free end of each rod 4 there is provided a ball-shaped enlargement 17 which partially suppresses the electrical point or brush effect of the antennae.

An illuminating body 14 such as the fluorescent ring light is placed within the body 2. A fan 15 is mounted in body 2 with its blade 15' placed below light 14. Above the lighting tube 14 and above the open top of cup-shaped body member 2 a cover plate 9 is concentrically placed. The diameter of cover plate 9 is smaller than the diameter of the open top of cup-shaped body member 2. The cover plate 9 has ribs or points 10 extending downwardly from its underside, which together with plate 9 serve as a negatively charged electrode, while the body member 2, and the antennae 3 serve as positively charged electrodes.

Cover plate 9 is attached to the ceiling 6 of the room by a tubular member 11. The illuminating body 14 and the fan are concentrically supported within body 2 by an insulated tube 11 which is secured to cover plate 9. The cup-shaped body member 2 is also supported by cover plate 9 by means of insulated connecting rods 13 which are affixed at the upper end to cover plate 9 and extend downwardly through the bottom 2' of cup-shaped body 2. Rods 13 extend below the bottom 2' of body 2 and terminate at a bottom glass cover plate 7. The body member 2 has at its bottom 2' an aperture 2", which opens a substantial portion of the bottom 2' of body 2 to the passage of air. To facilitate circulation of air through the aperture 2" of the body member 2, the glass plate 7 is held spaced from the body 2 and additionally provides with a plurality of bores or apertures 8. The glass plate 7 is merely to hide aperture 2" from view, but at the same time it can be made to have a decorative effect. Tube 11 is used as a conduit for the positive lead 43 of a power source 40' for the device, which is housed in a cover 12 which is attached to tube 11, and the ceiling 6.

Power source 40' of the invention is illustrated in FIG. 2a, and includes a high-tension rectifier 40, fed by a high-tension transformer 41, which is connected to a standard electrical supply outlet 42. The negative pole 44 of the rectifier 40 is connected to cover 12 and cover plate 9. The positive pole of power source 40' is connected to body 2 and rod electrodes 3 by a wire lead 43.

Cover plate 9 is placed at some distance above the body member 2, so that an annular vertical gap 16 exists therebetween facilitating the circulation of air through the body 2. In addition to the vertical gap 16 between the body 2 and the cover plate 9 there is a horizontal gap 16' due to the above-mentioned difference in diameter of the two.

Without the points or ribs 10 on the cover plate 9 and without the rod antennae 3, a strong homogeneous electrical field would develop between the cover plate 9 and the body member 2, establishing the above-mentioned blocking effect.

As the presence of a fan to circulate the air is not absolutely necessary, the embodiments of the invention illustrated in FIGS. 3, 4 and 5 do not include one.

In the embodiment of the invention illustrated in FIGS. 3, 3a, two concentrically arranged annular cylindrical body members 21 and 24, surround a cylindrical light enclosure 22. Eight rod antennae electrodes 3 radiate from the device. The outer tubular members 5 of electrodes 3 extend through the body member 21 and connect to the inner body member 24. The two annular body members 21 and 24 of this embodiment replace body member 2 of the embodiment of the invention illustrated in FIGS. 1 and 2. The body members 21 and 24 are suspended from an upper portion 22' of the light enclosure 22 by insulating hooks 21' and are connected by appropriate means to the positive pole of a power source 40'. Power source 40', such as that illustrated in FIG. 2a, is positioned within the upper portion 22' of the lighting body 22. The light enclosure 22 and its upper portion, or canopy 22', are both constructed of electrically conductive material and are connected to the negative pole of the power source 40'. The light enclosure 22 houses either an electrical bulb or a lighting tube which is connected as a conventional lamp to a standard electrical source. In this embodiment the circulation of air is through the cylindrical channels between cylindrical body members 21, 24 which are open at top and bottom, and aided by convection currents induced by heat generated by lighting body 22.

The embodiment shown in FIG. 5 differs from that in FIGS. 3 and 3a only in that there are three cylindrical body members 29, 30 and 31 which together form the positively charged electrode and from which adjustable rod antennae 27–28 radiate outwardly. The light enclosure 32 corresponds to the light enclosure 22 of FIGS. 3 and 3a. In all other respects, arrangement of the device of FIG. 5 is analogous to the devices of FIGS. 3 and 3a.

In the embodiment of the invention illustrated in FIGS. 4 and 4a, the telescoping rod antennae 3 are pivotally attached around the bottom edge of a cylindrical member 25. A second concentric cylindrical member 25' is held in position around member 25, and above the antennae 3, by insulating brackets 26'. The entire assembly is mounted on the ceiling. Cylindrical member 25' with the radiating rod antennae 3 serves as a positive electrode, while concentric tubular member 25' is the negative electrode. In this embodiment it is possible to fold the rod-like antennae 3 downwardly like an umbrella. The tubular member 25 is connected to the positive pole and 25' to the negative pole of power source such as 40' positioned within a cover 26. Cover 26 is affixed to the ceiling, and supports the remainder of the unit through a tie rod 26a attached to member 25.

The invention functions by creating a voltage field between the positively charged antennae electrodes and the floor of the room. By the setting of the antennae at different lengths and different angles of inclination to the housing, the device may be adapted to the size and conditions of the room.

For example, it has been found that when a device of the invention as above described is installed on the ceiling in the center of a room 12 to 18 feet square, and having a ceiling height of from 8 to 12 feet; by adjusting the rod antennae to an overall spread of from 60 to 120 centimeters, an electrical field potential of from 2000 to 4000 volts above the grounded floor can be created.

This field electrically acclimatizes the air within the room, and conditions the aerosols therein for separation, which is accomplished by circulating the air over the electrodes by fan or convection currents.

It is important to note that the invention can easily incorporate a light and be designed into a pleasing and decorative light fixture without any sacrifice of its effectiveness. Furthermore, continued attractive appearance and effectiveness are promoted by the fact that the positive dust-collecting electrodes may be easily removed for cleaning.

An installation of any of the foregoing embodiments of the invention can be carried out by any electrician or technical assistant. All that is necessary is to suspend the devices similar to any lighting body and connect them to house power.

The air of the room differs basically from the air in the open, in that the content of charged air particles is greater in the room than in the open air, especially in the region of the mean ions. The density of the small ions in the open is greater than that in the room, because the small ions in the room quickly agglomerate with other particles giving them their electrical charge. The advantageous biological effect of the small ions is thereby lost.

The invention removes these charged agglomerated particles or aerosols from the air and restores the balance of the small ions in the room air to that of the open air. Moreover, the blocking effect never occurs, because the antennae radiate in free space and present only a small surface.

The invention thus provides a considerable advance in the art of electrically acclimatizing rooms. The simple arrangement of the invention is economical, and can be installed at a considerable saving in cost and time.

While the principles of the invention have been described in connection with the above specific apparatus, it is to be clearly understood that this description is made only by way of example and not as a limitation to the scope of the invention.

What is claimed is:

1. A device for producing electric fields comprising a coaxial assembly of a plurality of annular cylindrical electrodes of substantially different diameter, electrical charging means having a positive and a negative pole, and means to electrically connect said positive and negative poles to said plurality of annular cylindrical electrodes, means to coaxially support said plurality of annular electrodes, including means to insulate positively charged annular electrodes from negatively charged annular electrodes, a plurality of rod-like antennae electrodes attached to and electrically connected to at least one of said positively charged annular cylindrically electrodes and radially extending therefrom a substantial distance into space beyond the outermost of said plurality of annular cylindrical electrodes, and means to attach the assembly to the ceiling of a room.

2. The device of claim 1 wherein said rod-like antennae telescope to varying lengths and have ball-shaped end pieces thereon sized to suppress brush effect to a desired extent.

3. The device of claim 1 wherein said means to coaxially support said plurality of annular electrodes includes means to removably attach the positively charged annular electrodes together with any attached rod antennae to said assembly.

4. The device of claim 3 further including a cylindrical housing for an electric lamp and fixture therefor,
   said housing comprising the innermost of said coaxial electrodes, and being connected to the negative pole of said charging means, and
   wherein said charging means is mounted within said housing.

5. The device of claim 4 wherein the outermost of said plurality of annular electrodes is positively charged, is concentrically mounted with said housing, and has a plurality of positively charged antennae radiating outwardly therefrom.

6. The device of claim 5 wherein said positively charged antennae are pivotally connected to said outermost annular electrode.

7. A device for producing an electric field in a room and for separating particles of matter from the air therein comprising
   a cup-shaped electrode, open at the top and having a large aperture in the bottom,
   a plurality of telescoping rod-like antennae affixed to and radially extending outwardly a substantial distance from said cup-shaped electrode,
   fan means mounted within said cup-shaped electrode to move air in through said aperture and out through the open top thereof, and
   an electric lamp fixture mounted within said cup-shaped electrode,
   a flat plate electrode mounted above the open top of said cup-shaped electrode, said flat plate electrode having a series of ribs integral therewith and extending toward the open top of said cup-shaped electrode,
   electric insulating means to suspend said cup-shaped electrode from said flat plate electrode including means to support said fan and said lamp fixture within said cup-shaped electrode,
   means connected to said flat plate electrode to suspend the device from the ceiling of a room, and
   electrical charge generating means having a positive and a negative output, means to connect said negative output to said flat plate electrode, and means to connect said positive output to said cup-shaped electrode and said rod antenna.

8. The device of claim 7 further including a circular cover plate greater in diameter than the aperture in said cup-shaped electrode, and insulator means suspending said cover plate below said cup-shaped electrode and over the aperture therein, so that said fan and lamp fixture are obscured from view from below the device.

References Cited

UNITED STATES PATENTS

| | | | |
|---|---|---|---|
| 647,687 | 4/1900 | Topham | 204—318 X |
| 977,336 | 11/1910 | Shaffner et al. | 204—318 |
| 1,984,159 | 12/1934 | Schwedenberg | 204—312 X |
| 2,060,842 | 11/1936 | Yaglou | 55—2 X |
| 2,127,229 | 8/1938 | McRae | 204—32 |
| 2,318,093 | 5/1943 | Penney | 204—317 |
| 2,419,538 | 4/1947 | Clark | 343—901 X |
| 2,583,066 | 1/1952 | Stiffel | 343—721 X |
| 2,979,158 | 4/1961 | Vlier | 55—139 |
| 3,134,075 | 5/1964 | Langevin | 325—118 |
| 3,182,329 | 5/1965 | Biesecker | 343—702 |
| 3,238,702 | 3/1966 | DeSeversky | 55—152 X |
| 3,311,108 | 3/1967 | Cristofv | 319—4 X |

FOREIGN PATENTS

| | | |
|---|---|---|
| 626,387 | 6/1963 | Belgium. |
| 816,463 | 5/1937 | France. |
| 894,154 | 10/1953 | Germany. |
| 512,165 | 8/1939 | Great Britain. |
| 337,178 | 5/1959 | Switzerland. |

DENNIS E. TALBERT, JR., Primary Examiner

U.S. Cl. X.R.

55—150, 154, 279, 385; 128—190; 204—312; 317—4, 262